(12) United States Patent
Tanaka et al.

(10) Patent No.: US 6,392,697 B1
(45) Date of Patent: May 21, 2002

(54) DIGITAL STILL CAMERA

(75) Inventors: Masahide Tanaka, Osaka; Katsutoshi Ito, Tokyo, both of (JP); In-seok Seo, Suwon-si (KR)

(73) Assignee: Samsung Techwin Co., Ltd, Changwon (KR)

( * ) Notice: Subject to any disclaimer, the term of this patent is extended or adjusted under 35 U.S.C. 154(b) by 0 days.

(21) Appl. No.: 09/026,167

(22) Filed: Feb. 19, 1998

(30) Foreign Application Priority Data

Jun. 30, 1997 (KR) .............................. 97-29440

(51) Int. Cl.$^7$ .............................................. H04N 5/225
(52) U.S. Cl. ....................................... 348/220; 348/207
(58) Field of Search ................................. 348/207, 211, 348/220, 222, 231, 232, 239, 373, 374, 375, 384, 390, 405.1, 14.01, 14.02, 14.04, 14.05, 14.12; 370/260–263; 345/3.3, 3.4; 455/550, 556, 566, 575; 375/240.21; H04N 5/225

(56) References Cited

U.S. PATENT DOCUMENTS 5,491,507 A * 2/1996 Umezawa et al ........ 348/14.02
5,821,986 A * 10/1998 Yuan et al. .................... 348/17
6,122,526 A * 9/2000 Parulski et al. ............. 455/556
6,181,954 B1 * 1/2001 Monroe et al. ............. 455/557

FOREIGN PATENT DOCUMENTS

JP    6-133081    5/1994
JP    6-268582    9/1994

* cited by examiner

Primary Examiner—Tuan Ho
(74) Attorney, Agent, or Firm—McGuireWoods LLP (57) ABSTRACT

A digital still camera capable of telecommunication includes a converting device which converts an optical image into a digital electronic signal indicative of a still image, a memory which stores at least one specific telephone number, a modifying unit which modifies the digital electronic signal indicative of the still image into an electronic signal containing a still image signal generated in accordance with a wireless telephone system, a reducing device which reduces a number of pixels of the still image converted by the converting device to form a still image of fewer pixels contained in the electronic signal, a transmitter which transmits the electronic signal containing the still image signal modified by the modifying unit, and a controller which inhibits the reducing device when the telephone number designating the remote device coincides with the specific telephone number, whereby the reducing device forms a still image signal contained in the electronic signal without reducing the number of pixels of the still image converted by the converting device.

7 Claims, 3 Drawing Sheets

DIGITAL STILL CAMERA

BACKGROUND OF THE INVENTION (a) Field of the Invention

The present invention relates to a digital still camera which converts an optical image into a digital electronic signal representative of the image and stores the digital electronic signal, and more particularly to a still camera capable of communicating with a remote site by means of a wireless telephone system.

(b) Description of the Related Art

In the field of digital still cameras, various types of communication of digital electronic image signals have been proposed. One of the typical proposals is to transmit the digital electronic image signal to a remote device, such as a computer, by connecting a digital still camera to a wireless telephone through a MODEM, and transmitting the signal to the remote device connected to a telephone line.

Japanese Laid Open Patent Application Nos. 6-133081 and 6-268582 disclose a digital still camera and a wireless telephone contained in a single housing. The purpose of combining the digital still camera and the wireless telephone in a single housing is to conserve memory to store the digital electronic image signals. In other words, the digital electronic image signals are transmitted from the digital still camera to a computer at a remote site with a large memory.

Such digital image signals would otherwise have to be stored in a memory device included in the digital still camera itself. Thus, the digital still camera can successively take and store a great number of shots without a large memory in the digital still camera itself, which makes possible a compact and inexpensive digital still camera. In other words, Japanese Laid Open Patent Application Nos. 6-133081 and 6-268582 disclose a digital still camera with a large capacity memory to receive digital electronic image signals taken by a remote device.

SUMMARY OF THE INVENTION

One object of the present invention is to provide a digital still camera including in a single housing a wireless telephone, which can receive and display a digital electronic image signal generated by another digital still camera. The digital still camera of the present invention receives digital electronic image signals generated by another digital still camera at a remote site without a large capacity memory.

Another object of the present invention is to provide a digital still camera that can receive audio and image signals simultaneously.

Another object of the present invention is to provide a digital still camera capable of telecommunication, in which a user can not only talk in the ordinary manner, but also may view the displayed still image while talking.

A further object of the present invention is to provide a digital still camera that can communicate both the audio and image signals at the same time.

Another object of the present invention is to provide a digital camera that can communicate with various types of telephones including a standard one that cannot receive an image signal.

Another object of the present invention is to provide a digital still camera that can transfer audio and image signals to the same type of digital still camera in a very short time period.

Another object of the present invention is to provide a digital still camera that can communicate with various remote devices including a computer.

In order to obtain these objects, the digital still camera of present invention includes:

a device which converts an optical image into digital electronic image signals;

a memory which stores at least one telephone number;

a device which reduces the number of pixels of the converted still image in order to form electromagnetic image signals with decreased number of pixels of the still image;

a device which converts the digital electronic image signals into electromagnetic signals in accordance with a wireless telephone system;

a device which transmits the converted electromagnetic image signals to a remote device with a telephone number; and a device which inhibits the reducing device when the telephone number of the remote device is a certain number.

Other objects and various advantages according to the present invention will be better understood by means of the following detailed description of the preferred embodiment in conjunction with the attached drawings.

BRIEF DESCRIPTION OF THE DRAWINGS

The above objects and features of the present invention will be apparent from the following description of the preferred embodiment with reference to the accompanying drawings.

DETAILED DESCRIPTION OF THE PREFERRED EMBODIMENTS

The above objects and features of the present invention will be apparent from the following description of the preferred embodiments with reference to the accompanying drawings.

Figure 1:
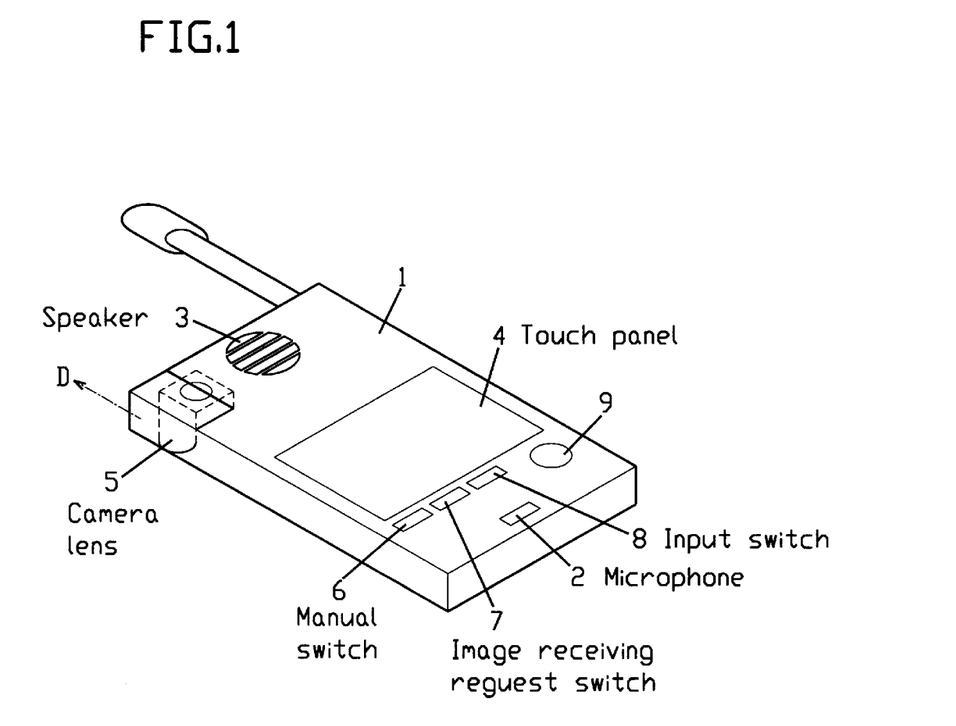
FIG. 1 is a perspective view of an embodiment of a digital still camera according to the present invention.

As shown in FIG. 1, a digital still camera according to an embodiment of the present invention includes a microphone 2 and a speaker 3 in a single housing.

Further, the digital still camera includes a display device (color liquid crystal display) 4 of a reflection type without back light illumination to save power, which displays a color image of 60,000 pixels. The display device functions as a touch panel of dial buttons for a digital phone.

A camera lens 5 can rotate and is normally aimed in a direction represented by arrow D that is not in the line of sight of the users who observe the display panel 4. However, the lens 5 can rotate so that it can be in line of sight of the users when they watch the display panel 4. The lens is illustrated by broken lines in FIG. 1.

The speaker 3 and the microphone 2 can function in a close mode or in a remote mode. In a close mode, the users put their ears and mouths close to the speaker 3 and microphone 2. In a remote mode, the users can put their ears and mouth relatively remote from the speaker and the microphone.

A manual switch 6 turns on the display device 4 to display a still image. The speaker 3 and the microphone 2 are automatically changed into the remote mode when the manual switch 6 turns on the display device 4.

An image receiving request switch 7 requests the remote device to transfer an image. An input switch 8 activates a touch panel on the display 4, which can accept an image formed by pen. The button 9 is a shutter release button.

Figure 2:
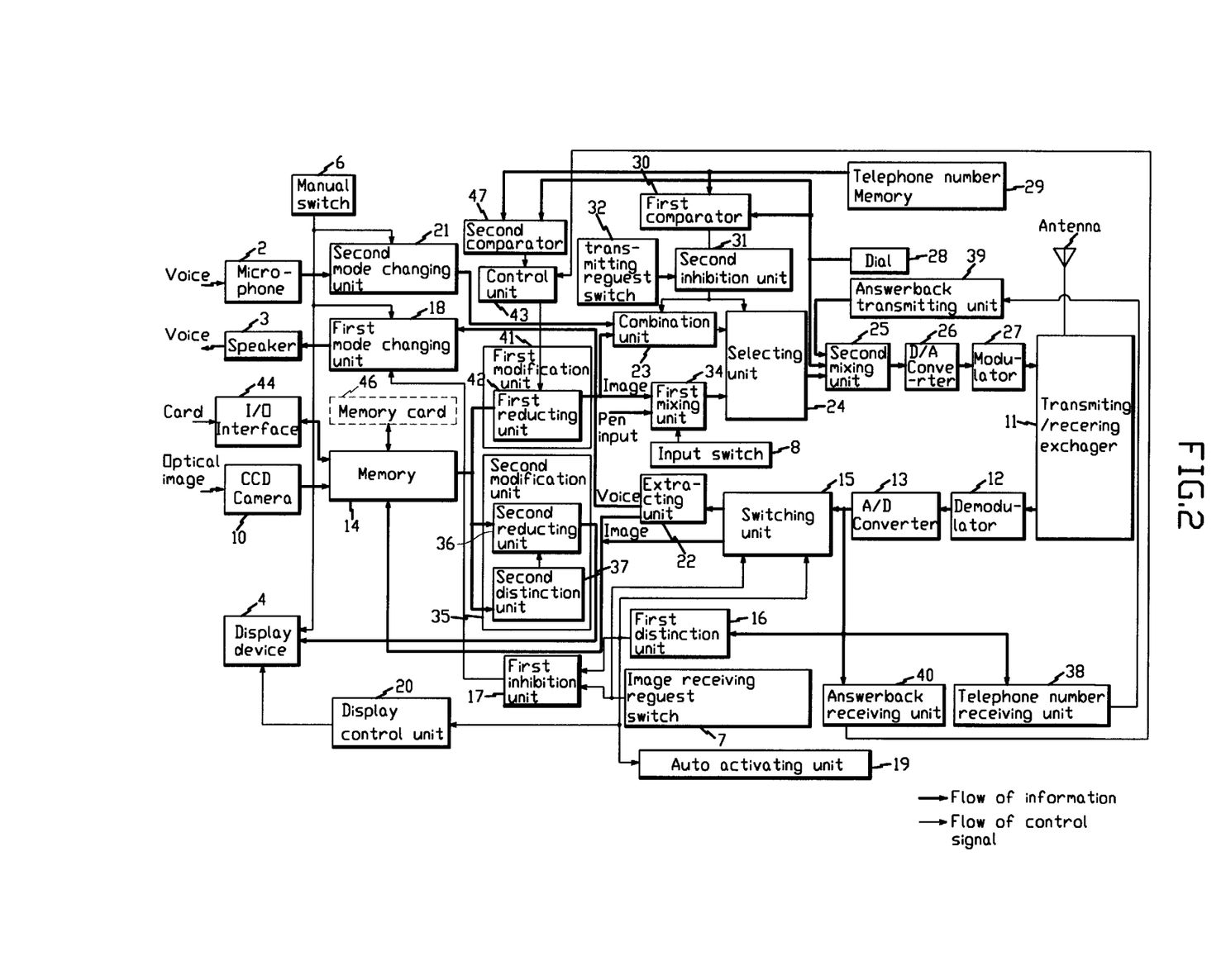
FIG. 2 is a block diagram of an embodiment of the digital still camera according to the present invention.

In FIG. 2, a thick line represents information flow and a thin line represents the flow of control signals of each function.

In more detail, the digital still camera according to an embodiment of the present invention includes a CCD camera 10 for converting an optical image into digital electronic image signals;

a transmitting/receiving exchanger 11 for receiving or transmitting electromagnetic signals of a wireless telephone system;

a demodulator 12 for demodulating the received electromagnetic signals, which is connected to the output of the transmitting/receiving exchanger 11;

an A/D converter 13 for converting the electromagnetic signals into digital electronic signals, which is connected to the output of the demodulation unit 12;

a switching unit 15 connected to the output of the A/D converter 13;

an extracting unit 22 for extracting still image signal components and audio signal components from the digital electronic signals, which is connected to the output of the switching unit 15;

a memory 14 for storing the still image signal from the extracting unit 22 or the digital still image signal from the CCD camera 10;

a speaker 3 for generating audio signals in response to the electromagnetic signals of the wireless telephone system received by the transmitting/receiving exchanger 11 and the demodulator 12;

a first mode changing unit 18 for rendering the speaker 3 in a close or remote mode;

a first distinction unit 16 for detecting an image signal from the digital electric signal converted by A/D converter 13 and automatically controlling the switching unit 15 from a first mode to a second mode;

a display control unit 20 for controlling the display device 4 to display whether the received electromagnetic signal contains a still image signal or audio signal, which is connected to the output of the first distinction unit 16;

a first inhibition unit 17 for turning the first mode changing unit 18 "OFF" to restrain the speaker 3 from generating a voice signal in the second mode, which is connected to the output of the first distinction unit 16;

an image receiving request switch 7 for operating the switching unit 15 from a first mode to a second mode, which is connected to the input of the switching unit 15;

a telephone number receiving unit 38 for receiving a telephone number signal in accordance with the wireless telephone system from another remote device, such as another digital still camera or a wireless telephone, which is connected to the output of the A/D converter 13;

an answer back receiving unit 40 for receiving a second answer back signal in accordance with the wireless phone system from another remote device, which is connected to the output of the A/D converter 13; and an auto activating unit 19 connected to the output of the first distinction unit 16.

In addition to the above-mentioned construction for receiving an electromagnetic signal from a remote device and outputting a corresponding audio signal and displaying a corresponding image, the digital still camera according to an embodiment of the present invention further includes:

a microphone 2 for converting a voice into an electronic audio signal;

a second mode changing unit 21 for activating the microphone 2 in a first/second mode;

a first modification unit 41 for forming a still image signal of a fewer number of pixels to be contained in a still image signal from the memory 14;

a combination unit 23 for combining the electronic voice signal from the second mode changing unit 21 and the still image signal from the first modification unit 41;

a first mixing unit 34 for mixing the still image signal from the first modification unit 41 and a signal input by pen when an input switch 8 is activated "ON";

a selecting unit 24 for outputting alternatively one of the signals from the combination unit 23 and from the first mixing unit 34;

a dial 28 for dialing a telephone number designating another remote device, a telephone number memory 29 for storing telephone numbers;

a first comparator 30 and a second comparator 47 for comparing the telephone number dialed by the dial 28 with the specific telephone number stored in memory29;

a second inhibition unit 31 for inhibiting the combination unit 23 from combining the electronic audio signal from the second mode changing unit 21 and the still image signal from the first modification unit 41 when the dialed telephone number designating another remote device is the specific telephone number stored in memory29;

a control unit 43 for controlling the first modification unit 41, which is connected to the second comparator 47;

a second modification unit 35 for judging whether the still image signal from the memory 14 is a first type or a second type which determines whether to reduce the number of pixels to be output on display 4;

an answer back transmitting unit 39 for generating a first answer back signal indicating the receipt of an electromagnetic signal transmitted from another remote device, which is connected to the output of the telephone number receiving unit 38;

a second mixing unit 25 for mixing signals from the selecting unit 24, the answer back transmitting unit 39, and the dial 28;

a D/A converter,26 for converting the signal from the second mixing unit 25 into an analog signal;

a modulation unit 27 for modulating the signal from the D/A converter 26 and outputting it to the transmitting/receiving exchanger 1 1; and an image transmitting request switch 32 connected to the input of the second inhibition unit 31.

The first modification unit 41 includes a first reducing unit 42 for reducing the number of pixels of the still image signal from the memory 14. The second modification unit 35 includes a second distinction unit 37 for judging whether the still image signal from the memory 14 is a first type or a second type and a second reducing unit 36 for reducing the number of pixels of the still image signal from the memory 14 and outputting the resultant image to the display device 4.

The digital still camera according to an embodiment of the present invention further includes a memory card 46 and an input/output interface unit 44 for outputting an image signal from memory card 46 to the memory 14.

The transmitting/receiving exchanger 11 is able to amplify the transmitted or received electromagnetic signals as well as transmit those signals.

The following is an explanation of the relationships among the sizes of the image handled by digital memory 14, display 4 and CCD camera 10.

The color still image signal generated by CCD Camera 10 and stored in memory 14 contains 240,000 pixels per frame; after reduction the displayed image contains 60,000 pixels per frame. The difference in the number of pixels makes it possible to more quickly transmit the image.

The second distinction unit 37 of the first modification unit 35 in FIG. 2 determines whether or not to reduce the number of pixels via the second reducing unit 36 depending on the size of the still image signal from memory 14, i.e., 240,000 or 60,000 pixels.

The input/output interface 44 serves as a means to extract the digital electromagnetic signal from the memory 14. The number of pixels of the still image per frame extracted from the memory 14 is 240,000.

Input/output interface 44 also enables an external card (46) to connect to the device. The memory card 46 stores digital electronic signals. It can also receive the digital electronic signal from the memory 14. The memory card 46 serves as a memory storing a still image of 240,000 pixels per frame and can be detachably inserted into the digital still camera.

Figure 3:
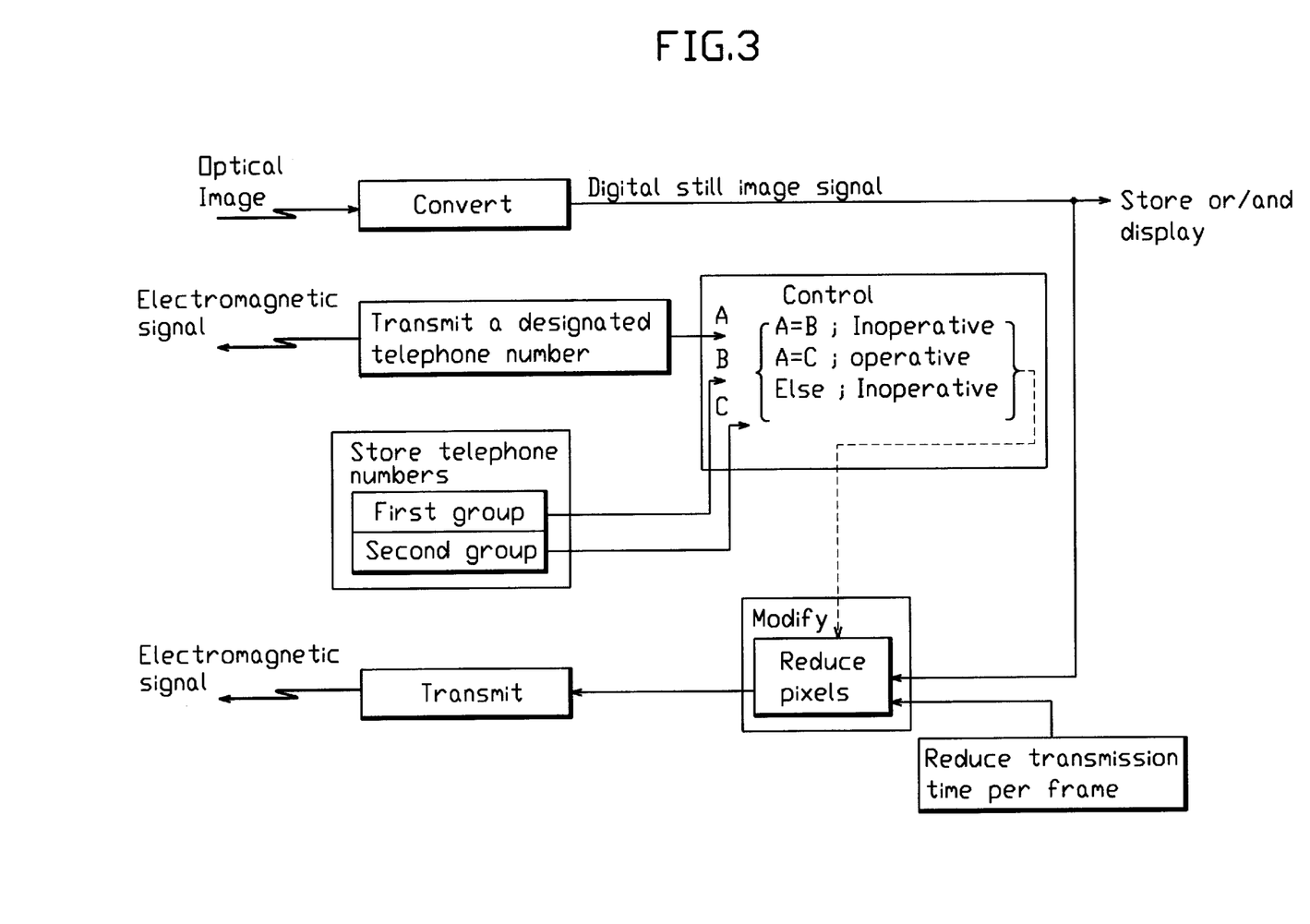
FIG. 3 is a block diagram showing a transmitting/receiving state of the digital still camera according to an embodiment of the present invention.

As shown in FIG. 3, when an optical image is to be converted into an electronic still image signal and transmitted to a remote device with a designated telephone number, the digital still camera according to the present invention reduces the number of pixels of the electronic still image signal when a designated telephone number matches a specific telephone number representing a remote device capable of receiving a still image signal. On the other hand, it does not reduce the number of pixels of the electronic still image signal when a designated telephone number matches another specific telephone number representing a remote device that is not capable of receiving a still image signal.

The above-mentioned operation of the digital still camera according to embodiments of the present invention will be explained in detail referring to FIG. 2.

First, an electromagnetic signal containing a still image signal formalized in accordance with a wireless phone system from another remote device is received and displayed as explained below. Also following is an explanation of how an electromagnetic signal containing an audio signal generated in accordance with a wireless phone system from another remote device is received and output.

Referring to FIGS. 2 and 3, an antenna of the digital still camera of the present invention receives an electromagnetic signal from a remote device, such as another digital still camera, and a transmitting/receiving exchanger 11 changes to a receiving mode and outputs the received electromagnetic signal to the demodulator 12.

The demodulator 12 demodulates the electromagnetic signal and outputs the demodulated signal to the A/D converter 13. The A/D converter 13 converts the demodulated electromagnetic signal into a digital electronic signal.

When a telephone receiving unit 38 receives from a remote device a telephone number identifying a digital still camera of the present invention through the transmitting/receiving exchanger 11, the demodulator 12, and the A/D converter 13, an answer back transmitting unit 39 outputs a first answer back signal identifying the digital still camera.

The first answer back signal is transmitted to the remote device via the transmitting/receiving exchanger 11 through a second mixing unit 25, a D/A converter 26 and a modulator 27.

The first answer back signal indicates that the digital still camera is capable of receiving an electromagnetic signal containing a still image signal of 60,000 pixels per frame.

The telephone number receiving unit 38 automatically activates the digital still camera of the present invention to receive a transmitted signal in response to the telephone number as an electromagnetic signal generated in accordance with a wireless phone system.

The signal from the A/D converter 13 is input to a switching unit 15 and a first distinction unit 16, respectively after the electromagnetic signal containing a still image signal from the remote device is transmitted and is processed, as described above.

The first distinction unit 16 distinguishes a still image signal from the digital electronic signal containing a voice signal and automatically switches the switching unit 15 from the first mode to the second mode. At the same time, the first distinction unit 16 outputs a corresponding control signal to the first inhibition unit 17.

At this time, display device 4 indicates with characters or symbols that the device has received a still image or a still image with audio signals.

The switching unit 15 is provided to switch between a first mode and a second mode. The first mode generates audiovia speaker 3 and the second mode displays a still image on display device 4 in response to the received digital signal.

The digital still camera according to the present invention is set in an automatic mode in which the first distinction unit 16 automatically switches the switching unit 15 from the first mode to the second mode in order to receive electromagnetic signals of a still image from the remote device.

The auto activating unit 19 is effective in the automatic mode for automatically activating the functions of receiving the electromagnetic signals of a still image in response to the telephone number identifying the digital still camera of the present invention when the first distinction unit 16 distinguishes the electromagnetic signals of a still image.

In a manual mode, the first distinction unit 16 does not automatically switch the switching unit 15 from the first mode to the second mode. The switching unit 15 can be activated from the first mode to the second mode by a manual request switch 7 in a manual mode. Also, in manual mode, a manual switch 6 can turn on the display device 4 and it can also switch first and second mode changing units 21 and 18 from the first mode to the second mode.

The switching unit 15 outputs the digital electronic signal from the A/D converter 13 to a memory 14 when the first distinction unit 16 has set the device in the second mode. At the same time, the first inhibition unit 17 turns off the first mode changing unit 18 to keep the speaker 3 from generating an audio signal in the second mode.

The digital electronic signal of a still image fed into the memory 14 by the switching unit 15 is output to display device 4 through a second modification unit 35. A second distinction unit 37 of the second modification unit 35 determines whether the still image signal is of a first type or a second type and outputs a corresponding control signal to the second reducing unit 36. The number of pixels of the display device 4 is 60,000. The second distinction unit 37 activates the reducing unit 36 to match the number of pixels of the still image signal with that of the display device 4.

In more detail, when the received still image signal is a first type, the number of pixels of the received still image signal is equal to that of the display device 4 and the second distinction unit 37 turns the second reducing unit 36 "OFF". Thus, the original still image signal from the memory 14 passes by the second reducing unit 36 without reducing the number of pixels.

On the other hand, when the received still image signal is a second type, the number of pixels of the received still image is greater than that of the display device 4, and the distinction unit 37 turns the second reducing unit 36 "ON". Thus, the original still image signal from the memory 14 passes through the second reducing unit 36 and the number of pixels is reduced from 240,000 to 60,000.

Reduction of the number of pixels of an image may be employed as follows. The first reducing unit 42 and the second reducing unit 36 are programmed by software. When loading 240,000 pixels (100×100) of the image data stored in the memory 14, either the odd addresses can be loaded or the even addresses can be loaded, whereby the number of pixels of an image data is reduced by 60,000 pixels (50×50).

Accordingly, the display device 4 always displays a still image of 60,000 pixels per frame corresponding to electromagnetic signals containing a still image signal from a remote device.

An example of talking on the phone while watching an image on display device 4 is the case where the device receives audio signals while receiving a still image at the same time. In this case, a combination of a still image and audio signals is received as an electromagnetic signal generated in accordance with a wireless phone system.

When the device receives an electromagnetic signal containing a still image signal and an audio signal, the first distinction unit 16 detects an audio signal and sets the switching unit 15 to the first mode. The switching unit 15 outputs the electromagnetic signal to the extracting unit 22.

From the combination of both a still image and a voice signal, the extracting unit 22 extracts audio signal components for controlling the speaker 3 and a still image signal component for controlling the display device 4.

At this time, the first inhibition unit 17 turns the first mode changing unit 18 "ON" and the audio signal extracted from the extracting unit 22 is input to the first mode changing unit 18 and the still image signal extracted from the extracting unit 22 is input to a memory 14. The audio signal is output to a speaker 3 through the first mode changing unit 18, and the still image signal is processed by the second modification unit 35 and is displayed on the display device 4.

Accordingly, the user of the digital still camera can see a still image and hear a voice from a remote device because the display device 4 can display the still image while the speaker 3 generates the audio signal Following is a description of how a still image and an audio signal generated by the digital still camera of the present invention are transmitted to another remote device.

The user of the digital still camera designates a telephone number of a remote device, such as a wireless telephone, by activating a dial 28, which is formed as a touch panel in display device 4. The dialed telephone number is transmitted to a corresponding remote device by transmitting/receiving exchanger 11 through a second mixing unit 25, D/A converter 26, and a modulator 27 as an electromagnetic signal generated in accordance with a wireless phone system.

The D/A converter 26 converts digital signals corresponding to the dialed telephone number into analog signals and the modulator 27 modulates the analog signal, so that the modulated signal is transmitted to a corresponding remote device by the transmitting/receiving exchanger 11 as an electromagnetic signal generated in accordance with a wireless phone system.

The dialed telephone number is also input to the first comparator 30 and the second comparator 47.

When a user of the digital still camera speaks into the microphone 2, the microphone 2 converts the speech into electronic audio signals and the signals are input to the second mode changing unit 21. The second mode changing unit 21 outputs the electronic audio signals to the combination unit 23 and the electronic audio signals are transmitted by the transmitting/receiving exchanger 11 through the D/A converter 26 and the modulator 27.

The combination unit 23 is capable of combining a digital still image signal taken by a CCD camera with the audio signal to be transmitted. Therefore, the audio signal and the still image signal can be transmitted at the same time.

First, a still image signal taken by a CCD camera is stored in a memory 14 and the stored still image signal is output to a first modification unit 41.

The still image signal transferred to the first modification unit 41 is output to a combination unit 23 which combines the audio signals with the still image signal and outputs the combination according to the control of the second inhibition unit 31.

In more detail, the first comparator 30 compares the dialed telephone number with a telephone number stored in a telephone number memory 29 and outputs a comparison result to a second inhibition unit 31.

The phone number memory 29 is further capable of storing at least one telephone number of each of a first and second type of a remote device. The first type of remote device is not able to receive a still image, and the second type of remote device is able to receive a still image.

The second inhibition unit 31 inhibits the combination unit 23 from combining the electronic audio signal with a digital still image signal from a first modification unit 41 when the dialed telephone number designating a remote device matches the telephone numbers of the first type of remote device stored in the telephone number memory 29. In this case, the second inhibition unit 31 prevents the selecting unit 24 from selecting and outputting a still image signal.

On the contrary, when the dialed telephone number designating a remote device matches the telephone number of the second type of remote device stored in the telephone number memory 29, the second inhibition unit 31 allows the combination unit 23 to combine the electronic audio signal with a digital still image signal from a first modification unit 41. In this case, the second inhibition unit 31 controls a selecting unit 24 so as to select and output a still image signal.

Thus, the combination of the electromagnetic signal containing the still image with the audio signal can be transmitted when the dialed telephone number matches the specific telephone number of the remote device having a function capable of receiving a still image signal.

However, the second inhibition unit 31 controls the combination unit 23 and the selecting unit 24 to combine an audio signal with a still image signal when an image transmitting request switch 32 is activated.

Accordingly, only when the image transmitting request switch 32 is activated or the dialed telephone number matches the telephone numbers of the second type of remote device, the electromagnetic signal containing the still image and audio signals can be combined.

The signal containing audio signals from the microphone 2 and a still image signal taken by a CCD camera is transmitted to another remote device capable of receiving a still image signal via D/A converter 26, modulator 27, and transmitting/receiving exchanger 11.

The selecting unit 24 selects one of the digital electronic signals of the still image with audio signals combined by the combination unit 23 and the digital electronic signals of the still image without audio signals. In other words, the selecting unit 24 selects one of the signals from the combining unit 23 and the first mixing unit 34 and outputs it to the D/A converter 26 via the second mixing unit 25.

The still image signals are processed by the first modification unit 41 as described below and fed into the combination unit 23 and the first mixing unit 34.

If a second answer back signal from a corresponding remote device is received after a telephone number to a remote device is dialed as described above, the answer back receiving unit 40 receives the second answer back signal and sends it to the control unit 43.

The second answer back signal indicates that the remote device is of a specific type that can receive the first type of the electromagnetic signal containing a still image signal of 60,000 pixels per frame.

If the telephone number receiving unit 38 identifies that the corresponding digital camera is able to receive a still image signal of 60,000 pixels per frame by receiving the second answering back signal, the answer back unit 39 sends a signal to the corresponding digital still camera asking further to transmit the first type of the electromagnetic signal containing a still image signal of 60,000 pixels per frame. The control unit 43 activates a first modification unit 41 to reduce the number of pixels of a still image signal from the memory 14 when the second answer back signal is transmitted by the answer back receiving unit 40.

The first reducing unit 42 reduces the number of pixels of the still image from memory 14 to form a still image signal of fewer pixels so that the transmission time of a frame of the still image is shortened . In other words, a still image signal of 240,000 pixels at memory 14 is modified into a still image signal of 60,000 pixels per frame. The first reducing unit 42 is programmed by software. When loading 240,000 pixels (100×100) of the image data stored in the memory 14, either the odd addresses or the even addresses can be loaded. In this way, the number of pixels of image data is reduced to 60,000 pixels (50×50).

The first reducing unit 42 is inhibited when the answer back receiving unit 40 fails to receive the second answer back signal transmitted from the designated remote device, whereby the first modification unit 41 forms a still image signal to be contained in the electromagnetic signal without reducing the number of pixels of the still image signal from memory 14. In other words, a still image signal of 240,000 pixels is transmitted to the other remote device of as a type that cannot receive the first type of electromagnetic signal containing a still image signal.

The still image signal from the first reducing unit 42 is output to a first mixing unit 34, and the first mixing unit mixes the still image signal with a signal input by pen according to an operation of switch 8, so that the still image signal mixed with the pen-input signal is transmitted to another digital still camera by the transmitting/receiving exchanger 11 through a second mixing unit 25, a D/A converter 26 and a modulator 27.

The first reducing unit 42 reduces the number of pixels of the still image signal depending on the receipt of the second answer back signal, the first reducing unit 42 can also reduce the number of pixels of the still image signal depending on whether a dialed telephone number matches a specific telephone number either stored in the telephone number memory 29 or whether the second answer back signal is received.

The telephone number memory 29 stores a plurality of telephone numbers and the telephone numbers are classified into two types. The first type includes the telephone numbers of remote devices that cannot receive electromagnetic signals of a still image signal, while the second type includes telephone numbers of remote devices that can receive electromagnetic signals of a still image.

The second type is further divided into a first subgroup and a second subgroup. The first subgroup is for a remote device that can receive the electromagnetic signal containing a still image signal of 60,000 pixels per frame. The second subgroup is for a remote device of another type that can receive only the second type of the electromagnetic signal containing a still image signal of 240,000 pixels per frame.

Following is an explanation of an image signal transmission operation according to a dialed telephone number. The second comparator 47 compares a dialed telephone number with a specific telephone number stored in the telephone number memory 29. According to the comparison result, the first reducing unit 42 does or does not reduce the number of pixels of the still image signal from the memory 14.

For example, assume that, in the telephone memory 29, a quick dial number "111" for an actual telephone number "03-5566-0350" is stored as a first type, a quick dial number "112" for an actual telephone number "03-5566-0622" is stored as a first subgroup of the second type and a quick dial telephone number "113" for an actual telephone number "053-465-7017" is stored as a second subgroup of the second type. And also assume that a quick dial number "114" for an actual telephone number "1053-465-7081" is not stored in telephone number memory 29.

In this example, if a quick dial number "111" is dialed, dial 28 outputs a real telephone number "03-5566-0350" to the second mixing unit 25 and the real telephone number is transmitted as an electromagnetic signal generated in accordance with a wireless telephone system.

Next, the first comparator 30 checks if the quick dial number "111" matches one of the quick dial numbers classified as the first or the second type in the telephone memory 29. Since the quick dial number "111" in this case matches the telephone number classified as the first type, the first comparator 30 tells the second inhibition unit 31 not to allow the combination unit 23 to combine a still image signal with an electronic voice signals and selecting unit 24 to select a still image signal.

On the other hand, if the quick dial number "112" or "113" is dialed, the first comparator 30 detects that it matches the second type in telephone number memory 29 and the second inhibition unit 31 allows the combination unit 23 to combine a still image signal with electronic audio signals, and also allows the selecting unit 24 to select the digital electronic signal a still image. Further, in this case, the second comparator 47 and the control unit 43 changes the number of pixels of the still image signal from the memory 14 alternatively.

In other words, if a quick dial number "113" is dialed, the second comparator 47 detects that it matches the number in the second subgroup of the second group stored in the telephone number memory 29 and inhibits the first reducing unit 42. Thus, the first modification unit 41 generates the original still image signal without reducing the number of pixels of the still image.

On the other hand, if a quick dial number "112" is dialed, the second comparator 47 detects that it matches the number in the first subgroup of the second group stored in the telephone number memory 29 and allows the first reducing unit 42 to be operative. Then the first modification unit 41 generates a still image signal with a reduced number of pixels than that in the memory 14.

Further, if a quick dial number "114" is dialed, the second comparator 47 detects that it matches neither the first subgroup nor the second subgroup of the second group and it will make the first reducing unit 42 inoperative. Then the first modification unit 41 generates a still image signal contained in the electromagnetic signal from the memory 14 without reducing the number of pixels of the still image signal.

As mentioned above, the number of pixels of the still image signal to be transmitted is or is not reduced depending on the image signal processing capacity of a remote device to which the still image signal from a CCD camera or an input/output interface 44 or memory card 46 will be transmitted. Also, the number of pixels of the still image signal is or is not reduced depending on the image signal processing capacity of the digital still camera receiving the still image signal, thus the digital still camera can communicate with another remote device, such as another CCD camera or a computer.

As described above, the present invention, in accordance with the embodiment, provides a digital still camera capable of telecommunication including in one inseparable housing a wireless phone, which can receive and display a still image taken by another digital still camera.

Also, the present invention provides a digital still camera that can suitably receive the voice signal and the image signal without any confusion and can talk not only in an ordinary manner, but also with the displayed still image being displayed and watched.

Also, the present invention provides a digital still camera that can communicate both the audio signal and the image signal at the same time and can not only communicate with various types of telephone including an ordinary one that are not capable of receiving image signals but also communicate with the same type of digital still camera with a minimum communication time.

While it has been shown and described what are at present the embodiments of the invention, it will be obvious to those skilled in the art that various changes and modifications can be readily made therein without departing from the scope and sprit of the invention as defined by the append

What is claimed is:

1. A digital still camera, comprising:
   a device which converts an optical image into a digital electronic signal indicative of a still image;
   a memory which stores at least one telephone number;
   a modifying unit which modifies said digital electronic signal indicative of the still image into an electronic signal containing a still image signal in accordance with a wireless telephone system;
   a device which reduces the number of pixels of the still image converted by the converting device to form a still image having fewer pixels in the electronic signal;
   a transmitter which transmits an electromagnetic signal containing the still image signal modified by said modifying unit; and
   a device which inhibits the reducing device when the telephone number designating a remote device matches a specific telephone number, whereby said reducing device generates an electronic signal containing a still image without reducing the number of pixels of the still image converted by the converting device.

2. A digital still camera in accordance with claim 1, wherein the memory stores a plurality of telephone numbers, the telephone numbers being classified into a first type corresponding to a remote device capable of receiving a still image signal having a first number of pixels, and a second type corresponding to a remote device capable of receiving a still image having a second number of pixels, wherein the first number of pixels is less than the second number of pixels.

3. A digital still camera in accordance with claim 2, wherein said controller renders said reducing device operative when said telephone number designating the remote device matches a telephone number of the first type, whereby said modifying unit generates an electronic signal containing a still image signal of fewer pixels.

4. A digital still camera in accordance with claim 2, wherein said controller renders said reducing device inoperative when said telephone number designating a remote device does not match any telephone numbers of said first or second type, whereby said modifying unit generates an electronic signal without reducing the number of pixels of the still image converted by the converting device.

5. A digital still camera in accordance with claim 2, wherein said reducing device further shortens the transmission time for one frame of the still image signal by reducing the number of pixels.

6. A digital still camera, comprising:
   a converting device which converts an optical image into a digital electronic signal indicative of a still image having a first number of pixels;
   a memory which stores at least one specific telephone number corresponding to a remote device capable of receiving a still image signal having a second number of pixels;
   a modifying unit which modifies the digital electronic signal indicative of the still image into an electromagnetic signal containing a still image signal in accordance with a wireless telephone system;
   a reducing device which reduces the number of pixels of the still image converted by the converting device to form an electromagnetic signal containing a still image with fewer pixels;
   a transmitter which transmits the electromagnetic signal containing the still image signal modified by said modifying unit; and
   a controller which inhibits the reducing device when said telephone number designating the remote device matches said specific telephone number, whereby the reducing device generates an electromagnetic signal containing a still image signal with fewer pixels, and wherein the second number of pixels is less than the first number of pixels.

7. A digital still camera, comprising:
   a converting device which converts an optical image into a digital electronic signal indicative of a still image having a first number of pixels;
   a memory which stores at least one specific telephone number corresponding to a remote device capable of receiving a still image signal having a second number of pixels;
   a modifying unit which modifies the digital electronic signal indicative of the still image into an electromagnetic signal containing a still image signal in accordance with a wireless telephone system;
   a reducing device which reduces the number of pixels of the still image converted by said converting device to form a still image of fewer pixels contained in the electromagnetic signal;
   a transmitter which transmits the electromagnetic signal containing said still image signal modified by said modifying unit; and a controller which inhibits the reducing device when the telephone number designating the remote device does not match said specific telephone number, whereby said reducing device generates an electromagnetic signal containing a still image without reducing the number of pixels of the still image converted by said converting device, and wherein the second number of pixels is less than the first number of pixels.

* * * * *